(No Model.)

J. H. FENTON.
Toe Weight for Horses.

No. 241,131.                    Patented May 10, 1881.

WITNESSES:
John Mueller
G. H. Bennett

INVENTOR.
John H. Fenton.
Geo. E. Frink
his Attorney

UNITED STATES PATENT OFFICE.

JOHN H. FENTON, OF INDIANAPOLIS, INDIANA.

TOE-WEIGHT FOR HORSES.

SPECIFICATION forming part of Letters Patent No. 241,131, dated May 10, 1881.

Application filed November 1, 1880. (No model.)

*To all whom it may concern:*

Be it known that I, JOHN H. FENTON, a citizen of the United States, residing at Indianapolis, in the county of Marion and State of Indiana, have invented a new and useful Improvement in Toe-Weights, of which the following is a specification.

My invention relates to improvements in horse toe-weights, in which the spur is secured to the shoe and hoof by an inclined screw or pin and the weight secured to the spur by a set-screw; and the object of my invention is to provide a toe-weight and spur which can be readily secured to the shoe and toe of a horse's hoof. This object I accomplish by the mechanism illustrated in the accompanying drawings, in which—

Figure 2:
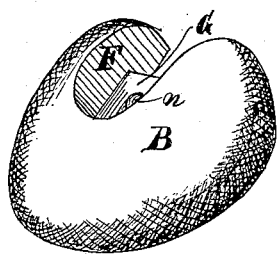
Figure 1:
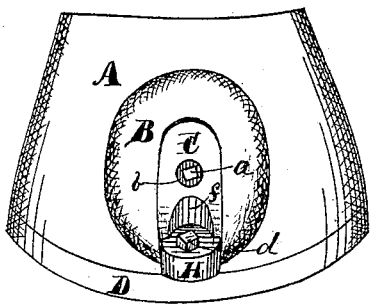
Figure 3:
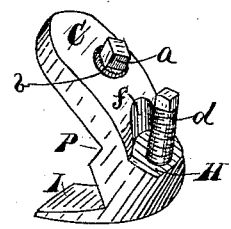
Figure 4:
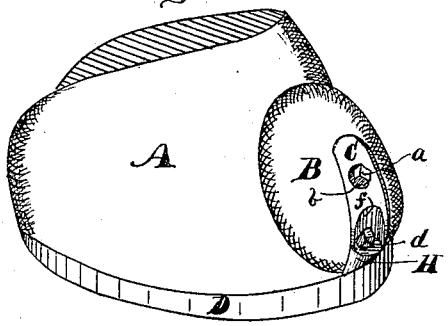
Figure 5:
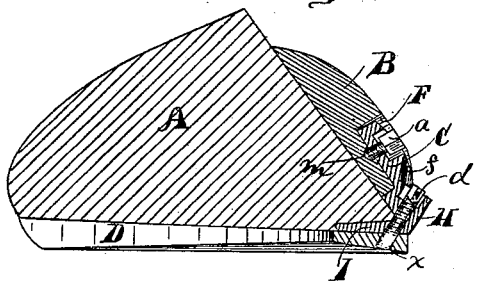
Figure 6:
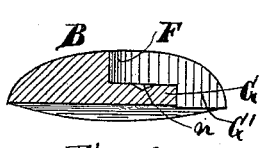
Figure 7:
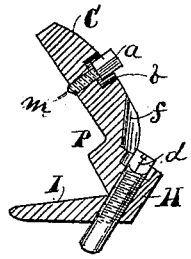

Figure 1 represents a front elevation of a horse's hoof, showing the weight and spur attached to it and the shoe. Fig. 2 is a perspective view of the toe-weight. Fig. 3 is a perspective view of the spur. Fig. 4 is a perspective view of a horse's hoof, showing a quartering view of the toe-weight and spur. Fig. 5 is a longitudinal section of the hoof and shoe, showing a sectional view of the spur and toe-weight and the manner of securing the same to the shoe and hoof. Fig. 6 is a sectional view of the toe-weight. Fig. 7 is a sectional view of the spur.

Similar letters refer to like parts throughout the several views.

A represents a horse's hoof; B, the toe-weight; C H I, the spur; D, the horseshoe.

The toe-weight B is provided with a recess, F, to receive the upper end, C, of the spur. This recess F has a floor or bottom, G, extending from its upper end about half-way to the lower end of the weight, as shown in Figs. 2, 5, and 6. The floor or bottom G is provided with a countersunk recess, n, to receive the pointed end m of the screw a, which is in the upper shank, C, of the spur.

The spur C H I is of peculiar construction, to wit: The part I fits in a notch cut in the front of the hoof above the shoe D or recessed in the shoe. The front part, H, projects away from the hoof, as shown, and is provided with an inclined hole, in which the inclined screw or pin d operates. The upper part or shank, C, is inclined backward to fit the angle of the hoof, and is provided with a notched part, P, which, together with the front face of the hoof, forms a recess for the floor or bottom G of the weight to fit in, while the shank C fits in the recess F of the weight. The shank C is provided with a screw-threaded hole, the outer end of which is counterbored to receive the screw a, by means of which screw the weight B is secured to the spur and hoof. The lower end of the inclined screw d in the part H of the spur, when screwed home, fits in the hole X of the shoe, and holds the spur firmly in position and prevents the spur from working loose. The weight B is then placed on the shank C of the spur and made fast by the set-screw a, as shown in Figs. 1, 4, and 5.

The advantages of the peculiar construction of this weight are that the spur may remain upon the hoof independent of the weight, while the weight is removed, and the spur itself can be adjusted and removed at pleasure. Further, the incline of the screw or pin, by pressing against the rear side of the hole in the shoe, prevents the part I of the spur from being pressed upward against the tender part of the horse's hoof, while the front part of said screw or pin, by being encompassed by the front part of the shoe, prevents the spur from slipping out. By turning the screw or pin at an angle, as shown, I obtain advantages that could not be secured as well by any other means. For instance, the angle enables the screw or pin to penetrate the shoe without necessitating any enlargement of the same and draws the spur downward from the hoof.

What I claim as my invention, and desire to secure by Letters Patent, is—

1. In a toe-weight, the spur C H I, provided with the inclined screw-pin d and set-screw a, in the manner and for the purpose described.

2. In combination with the spur C H I, provided with the inclined screw-pin d, the shoe D, provided with a hole, X, in its toe, substantially as shown and described.

3. The spur C H I, provided with the inclined screw-pin d, adapted to receive the weight B and secure the spur to a shoe, substantially as shown and described.

4. In combination with the spur C H I, provided with the inclined screw-pin d and screw a, the recessed weight B, as and for the purpose specified.

In testimony whereof I have signed my name to this specification in the presence of two subscribing witnesses.

JNO. H. FENTON.

Witnesses:
  E. O. FRINK,
  G. H. RENNETT.